B. R. BEHNKE & V. KEECH.
DRIER FOR ORES, SAND, &c.
APPLICATION FILED SEPT. 3, 1913.

1,123,222.

Patented Jan. 5, 1915.
5 SHEETS—SHEET 1.

UNITED STATES PATENT OFFICE.

BERNARD R. BEHNKE AND VERNON KEECH, OF MOUNT IRON, MINNESOTA.

DRIER FOR ORES, SAND, &c.

1,123,222.　　　　Specification of Letters Patent.　　Patented Jan. 5, 1915.

Application filed September 3, 1913. Serial No. 787,901.

*To all whom it may concern:*

Be it known that we, BERNARD R. BEHNKE and VERNON KEECH, citizens of the United States, residing at Mount Iron, in the county of St. Louis and State of Minnesota, have invented certain new and useful Improvements in Driers for Ores, Sand, &c., of which the following is a specification.

Our invention relates to driers and particularly to that class of driers in which the material to be dried is tumbled about within a drying drum while heated air or products of combustion are passed through the drum and in contact with the material to be dried.

The primary object of this invention is the provision of a drying mechanism of the character described within which means are provided, first for uniformly distributing the material to be dried over a series of grates through which heated air passes so that not only is the material primarily submitted to a heating action before passing to the drying drum, but whereby dust may be blown from the material and carried upward into the stack, and second passing the material after this preheating into a rotatable perforated drum disposed inside the regular heating and tumbling drum whereby material greater than a certain size is prevented from passing into the main drying or tumbling drum, and whereby the material so passed into the main tumbling drum will gradually be fed along the drum from the upper end to the lower end thereof and discharged, the material being submitted to the action of hot gases or products of combustion from a furnace which primarily heats the exterior of the drying and tumbling drum, the heated products being carried through the tumbling drum and then drawn out from one end thereof by means of a fan and projected into the stack and acting to preheat the materials as previously stated.

A further object of the invention is to provide means whereby the material retained within the tumbling and drying drum while being carried to the discharge end of the drum is allowed to fall in streams from the uppermost portion of the drum to the lowermost portion thereof, thus passing the material directly through the currents of hot air or other hot gas passing through the drum.

A further object is to provide a fan so disposed that the streams of material passing from the hopper on their way to the drying drum will be subjected to hot products of combustion so that the material shall be preheated and so as to remove the particles of dust which may adhere to the material and carry these particles up into the stack or dust collector.

A further object of the invention is to provide a stack which forms a dust collector and which is so constructed as to cause a plurality of eddy currents to be formed within the chamber or collector, thus causing a relatively slow movement of the air, thus allowing the dust to settle and return into the drier.

A further object of the invention is to provide gratings over which the material passes on its way from the hopper to the drying and tumbling drum, which gratings are so constructed that they may be bodily inclined to a greater or less degree to thus accelerate or retard the passage of the material over the gratings, and in which the separate slats of the gratings may be opened or closed to a greater or less extent, thus increasing or decreasing the draft of the hot air passing through the gratings and also permitting the hot air to be directed at the most effective angle.

A further object is to provide in connection with the hopper a discharging floor and a conveyer passing thereover, the floor being so constructed that it will distribute the particles of material falling from the conveyer uniformly over the grating.

A further object is to provide an improved means for supporting the tumbling and drying drum so that the driving pinion of the drum may be located directly under the load and so that when the power is applied to the driving pinion it will have a tendency to lift the drying drum.

A further object is to provide means whereby the inclination of the drying and tumbling drum may be altered, thus altering the rapidity with which the material passes through the drum.

A further object is to provide a mechanism wherein dry air is forced through streams of falling material, this dry air absorbing the moisture from the material without, however, raising the temperature of the material to the boiling point.

A further object is to so construct the tumbling drum and the subsidiary drum or screen within which the material is first received as to cause it to retain larger lumps or pieces and suspend them as it were in the passing gases. These larger chunks of material which will not pass through the screen become heated and in rolling and tumbling within the revolving screen wear away the dry particles and finally become greatly reduced in size as well as in moisture. If these large lumps were allowed to fall into the main tumbling drum with the other material and finer particles, they would become buried and the moisture would be to a relatively great extent retained.

Other objects will appear in the course of the following description.

Our invention is illustrated in the accompanying drawings wherein.

Corresponding and like parts are referred to in the following description and indicated in all the views of the accompanying drawings by the same reference characters.

Figures 1, 4:
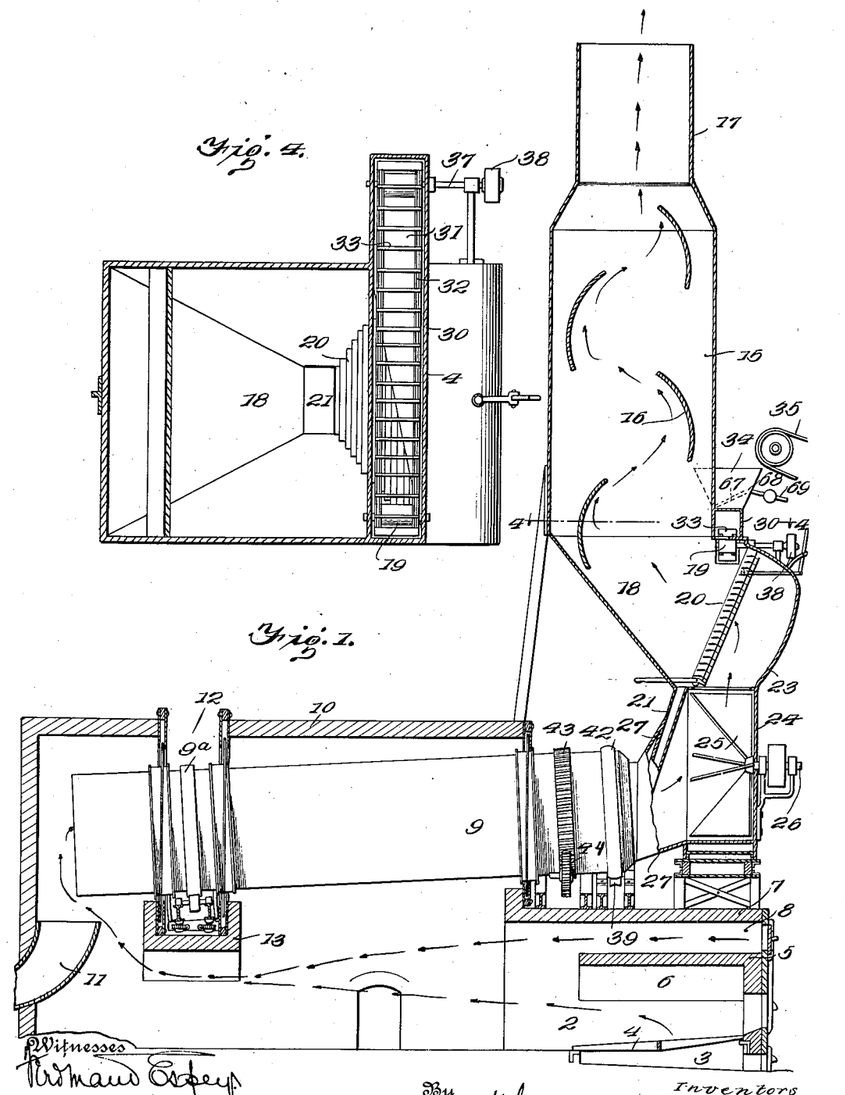
Figure 1 is a longitudinal sectional view through a drier constructed in accordance with our invention, the tumbling and drying drum being in elevation.
Fig. 4 is a horizontal section on the line 4—4 of Fig. 1.

Referring to Fig. 1, 2 designates a furnace which may be of any suitable construction but which is shown as having the ash pit 3, the grate bars 4, the arch 5 which incloses the combustion chamber 6 and an upper arch 7 disposed in spaced relation to the arch 5 and extending beyond the latter, the space 8 between the arches 5 and 7 constituting an air inlet passage.

Mounted above the arch 7 of the furnace is the forward end of a tumbling and drying drum designated 9 whose construction will be later described, and surrounding this drum is a wall 10 of a chamber within which the drum is entirely inclosed, this chamber being a continuation of the furnace and being hereafter designated as the hot air chamber. At the rear end of this chamber and immediately beneath the discharge end of the drum 9 is a discharge hopper 11.

The upper wall of the chamber 10 is broken away at 12 for a purpose to be later stated, and extending across the chamber 10 is a bridge wall 13 having a channel form in cross section for the purpose of supporting the beams upon which the intermediate portion of the drum is mounted. This drum 9 is rotatable by means which will be hereafter described and the upper end of the drum, that is, the portion of the drum which projects out through the forward end of the chamber 10 is rotatably mounted upon the wall 7 and is rotatably movable so as to permit the drum to tilt or be canted to a greater or less angle as will be later stated.

Disposed within the drum and rotatable therewith is a screen designated 14. This screen is perforated, reticulated or otherwise formed so as to provide a plurality of screening openings and rotates with the main or exterior drum 9. The screen is open at its upper end.

Disposed above the upper end of the drum and spaced therefrom is a dust collecting chamber designated 15 which may be of any suitable form and is provided with a plurality of baffle plates 16 which are shown as slightly curved, these plates being placed in staggered relation to each other and with their concave faces disposed toward the axial center of the dust collecting chamber. Above the dust collecting chamber is the stack 17 of which the dust collecting chamber forms a part. Below the lower end of the dust collecting chamber there is a hopper 18 whose mouth is wider than the width of the dust collecting chamber 15 to provide an inlet opening 19. The side of the hopper 18 adjacent this inlet opening is formed with a grating designated generally 20 whose detailed construction will be hereafter stated. At the bottom of the hopper and at the lower end off the grating 20 there is a duct 21 which leads into the open end of the screen 14. As will be noted from Fig. 2, the upper end of the screen 14, that is, the inlet end of the screen, is solid for a portion of its length as at 22.

Figure 2:
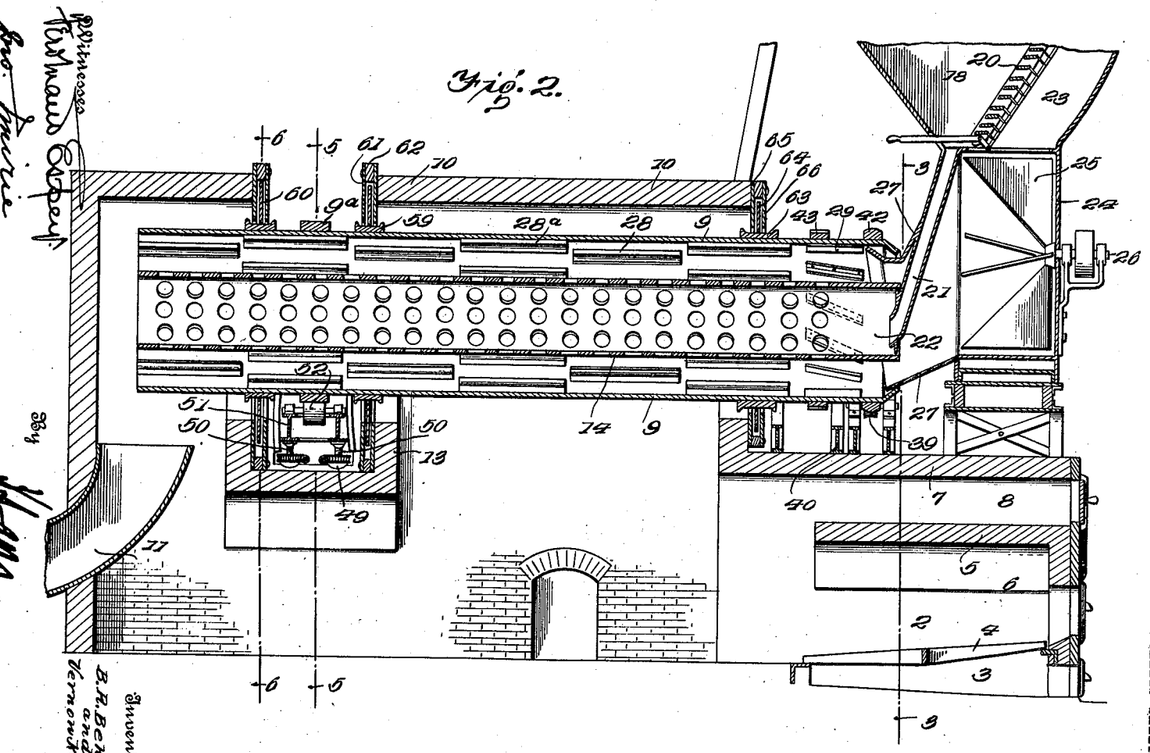
Fig. 2 is an enlarged longitudinal vertical section through the furnace, through the tumbling drum, the fan casing and the basal portion of the dust collecting chamber or stack.

Exteriorly disposed relative to the screen 20 is a wall 23 forming a chamber which communicates at its lower end with a fan chamber 24 within which is located a revolving fan 25. This fan is mounted upon a shaft 26 and this shaft is driven by a motor or in any other suitable manner. This fan casing 24 has walls 27 which extend beyond the upper open end of the drum 9 and extend into this drum as illustrated in Fig. 2. The purpose of the fan 25 is to suck the hot products of combustion through the drum 9 and force these products of combustion up through the screen 20 and into the dust collecting chamber 15 and out through the stack. The fan casing is mounted in any suitable manner upon the arch 7 forming the upper part of the furnace. It will be seen that the wall 27 is flared and that the adjacent end of the drum is contracted so as to fit over this flared portion and prevent any waste of the hot products of combustion or hot air though permitting the drum to revolve freely.

Figure 5:
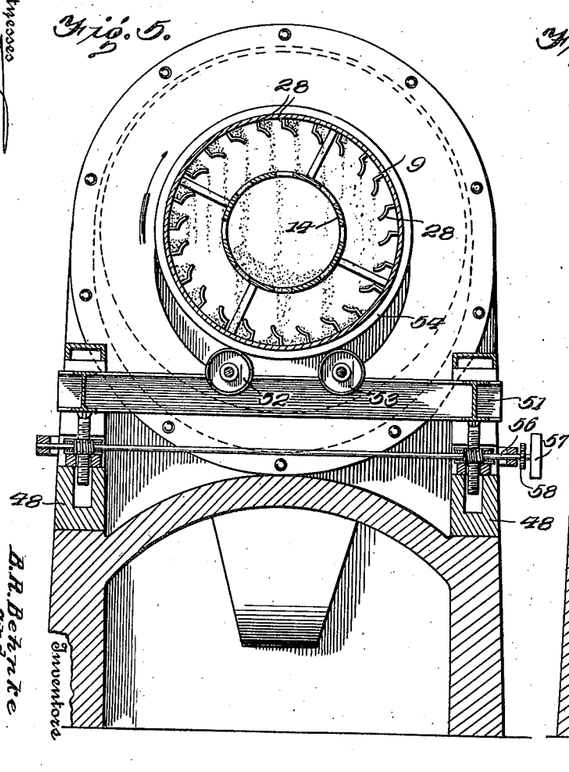
Fig. 5 is a vertical section on the line 5—5 of Fig. 2.
Figure 6:
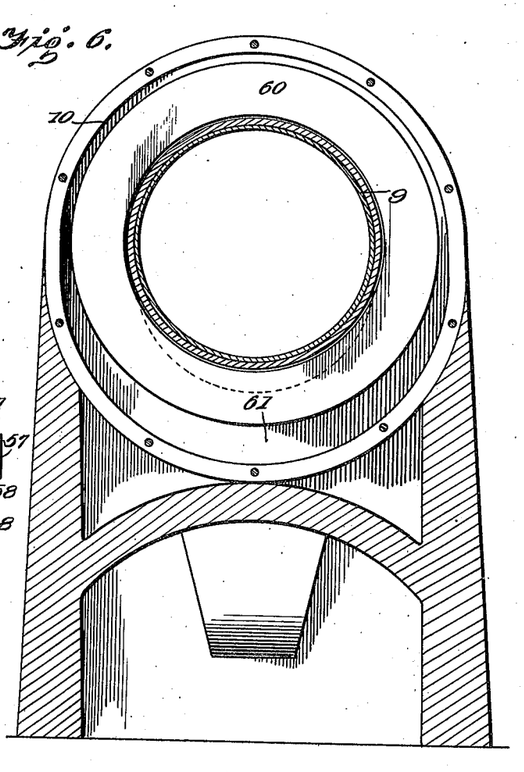
Fig. 6 is a vertical section on the line 6—6 of Fig. 2.

For the purpose of carrying the material within the drum upward as the drum revolves and dropping it at a certain point and at the same time feeding the material along the drum, we provide a plurality of lifters or flights 28 and 28$^a$. There are a plurality of series of these lifters or lifting blades, the blades of one series being set in staggered relation to the blades of the next series as illustrated clearly in Fig. 2. The shape of the blades is illustrated in Fig. 5. The plates or blades forming these lifters are curved or angularly arranged in such a manner as to allow them to distribute their load evenly as they revolve. The form of each lifter blade is such that it allows each particle or lump of ore or other material to fall in its respective turn so as not to retain the larger particles or lumps, allowing the smaller to fall first, but as the drying drum revolves each particle or piece falls as soon as the curved blade comes into its proper position. Thus the whole of the load carried by each pocket is not discharged at once but the load is gradually discharged, as illustrated in Fig. 5, and thus as the tumbling drum or drying drum revolves in the direction of the arrow, a plurality of streams of material will be sifted downward diametrically across the drum and submitted to the action of the heated gases passing through the drum.

Disposed at the forward or inlet end of the drum 9 on the inside face thereof and therefore disposed around the inlet end of the screen 14 are a plurality of curved or angular blades or lifters designated 29. These flights or blades are disposed in such a manner as to cause the particles of material falling onto the flights or blades to be thrown toward the rear, thus preventing any leakage of material over the front end of the cylinder into the chamber formed by the wall 27.

Disposed above the opening 19 whereby material is fed into the hopper 18 is a conveyer casing 30 illustrated in plan view in Fig. 4. The conveyer casing is longer than the width of the hopper 18 as shown in Fig. 4 and the bottom is designated 31. This bottom as illustrated in Fig. 4 has one edge thereof cut away on an incline so that at one side wall of the hopper the bottom is of a full width and at the other side wall there is practically no bottom, the edge defining this cutaway portion being straight. The conveyer used for the purpose of carrying the material across this floor comprises oppositely disposed sprocket chains 32 and vertical blades 33. The material is discharged into the conveyer casing 30 from a hopper 34 and material is discharged into this hopper from any suitable elevator or conveyer 35 shown in Fig. 1. It will be obvious that as the blades of the conveyer pass along the floor 31, the material will be scraped along and will be gradually dropped in uniform quantities from one end of the cutaway portion of the floor to the other and that as it drops the material will land upon the grating 20. This grating is formed of slats 36 pivoted in any suitable frame so that the slats may be rotated to any desired angle in the same manner as the slats of a shutter, and the frame itself is pivoted at its lower end so that the frame as a whole may be inclined rearward or outward to a greater or less extent. By regulating the inclination of the slats the direction and force of the blast of air passing up from the chamber 23 may be controlled and by adjusting the inclination of the frame supporting the grating, the rapidity with which the material will shift down over the grating and into the spout 21 or bucket will be regulated. It is of course obvious that if the grating is in the position shown in Fig. 1, the fall of the material past the grating will be relatively rapid while if the grating be inclined outward this fall will be less rapid. The slats will be regulated according to the fineness of the material, and also according to the direction it is desired to impel the blasts of air passing through the grating. The conveyer conveying the material across the floor 31 may be driven in any suitable manner but we have shown for this purpose a shaft 37 and a belt wheel 38.

The drying and tumbling drum is mounted at its upper end upon rollers 39 and 39$^a$ which in turn are mounted in bearings upon an upwardly inclined beam or other support 40 supported on standards 41. It will be seen that the roller 39$^a$ is located on a higher level than the roller 39. The upper end of the drum 9 has attached to it or carries a ring 42, the face of this ring being slightly convex laterally. The roller 39 is laterally concave as illustrated in Fig. 2 so as to fit the convexity of the ring 42, and this prevents longitudinal movement of the drum. The roller 39$^a$, however, has a flat surface and does not fit the convexity of the ring 42. Attached to the upper end of the drum 9 below the ring 42 is a band or ring 43 formed with teeth adapted to intermesh with teeth on a driving pinion 44. This driving pinion 44 or its shaft carries upon it a bevel gear wheel 45 shown in dotted lines in Fig. 3, which in turn gears with a bevel pinion 46 carried upon a shaft 47 having thereon a band wheel whereby the shaft 47 may be driven. It is obvious, however, that any other desired means may be used for driving this shaft 47 and thereby rotating the tumbling and drying drum.

Figures 7, 8:
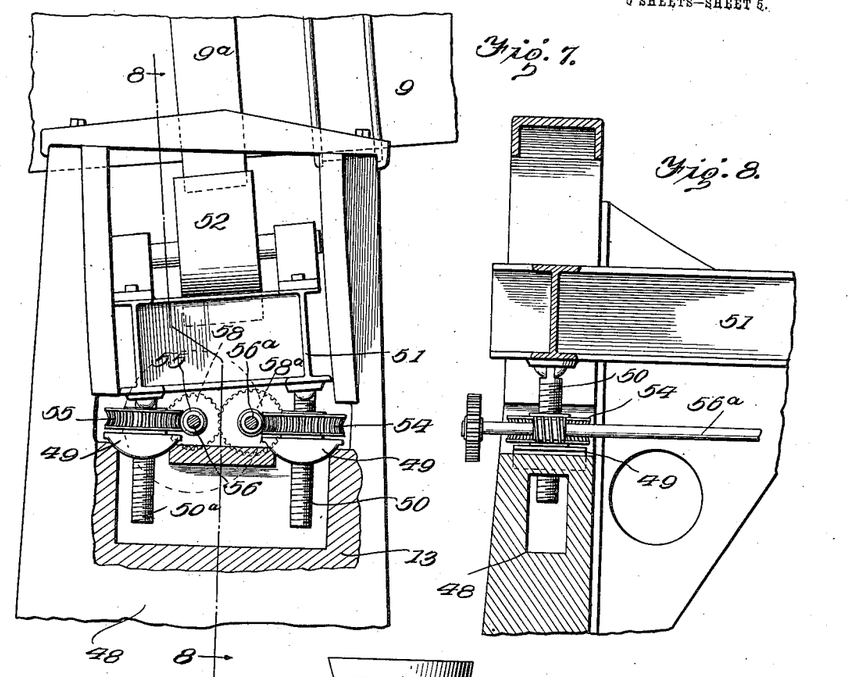
Fig. 7 is an enlarged side elevation partly broken away of a portion of a drum and the means for adjustably supporting the forward rollers from the drum.
Fig. 8 is a section on the line 8—8 of Fig. 7.
Figure 9:
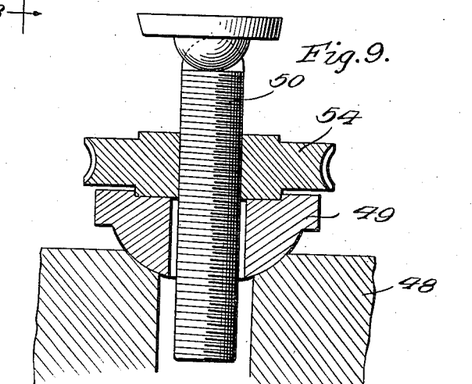
Fig. 9 is a detail sectional view of the means for adjusting the drum.

In order to raise and lower the delivery end of the drum 9, we have provided the mechanism which is illustrated more particularly in Figs. 2, 5 and 7. In this construction lateral standards 48 are provided, these standards or posts being bifurcated at their upper ends. Disposed within each of these standards are parallel rocking nuts designated 49, these nuts being set in convex sockets made for them. Extending through the nuts are the jack screws 50 and 50$^a$, each of which has a pivoted head at its upper end which engages beneath transverse beams 51. These transverse beams support bearings for the rollers 52 and 53, these rollers being straight faced. These rollers bear against a band 9$^a$ carried upon the drum. Inasmuch as this drum is laterally straight faced and the rollers 52 and 53 are laterally straight faced, it is obvious that the rollers 52 and 53 must be tilted laterally as the discharge end of the drum 9 is raised. It is to this end that we provide the rocking nuts 49 within which the jack screws 50 and 50$^a$ are mounted. It is obviously necessary that these jack screws 50 and 50$^a$ be rotated at different speeds in order that the rollers 52 and 53 may be canted. To this end we mount loosely upon each jack screw a worm gear wheel 54 resting loosely on the respective nuts 49 and engaging with a worm 55 on the shaft 56. There is one shaft for each of the jack screws. One of these shafts is designated 56 and the other 56$^a$ to distinguish them apart. The shaft 56$^a$ at its outer end is provided with a driving pulley 57 and interiorly of the driving pulley is formed with a gear wheel 58. The shaft 56$^a$ is also formed with a gear wheel 58$^a$ which is larger than the gear wheel 58. It will therefore be seen that the shaft 56 will be driven from the shaft 56 and that the shaft 56$^a$ will be driven slower than the shaft 56, and that as a consequence the jack screw 50 will be driven at a slower speed than the jack screw 50$^a$. The speed may be only very slightly slower but is just sufficient to compensate for the cant given to the rollers 52 and 53 as the drum 9 is elevated. It will be obvious that the greater the inclination of the drum the faster will the material be driven through the drum.

For the purpose of sealing the hot air chamber 10 and preventing the introduction of cold air through the opening 12, this opening being provided for the purpose of introducing the means for driving the drum, we provide sealing devices illustrated most clearly in Fig. 2. It will be seen from this figure that on each side of the ring 54 are disposed the rings 59 which are channeled upon their outer faces. Surrounding these rings 59 are loose annular disks or plates 60 which rest loosely upon these rings 59.

Fixedly attached to the bridge 13 and to the upper wall of the chamber 10 are the pairs of plates 61 spaced from each other by ring-like spacing members 62. Each pair of plates receives between them one of the disks 60. The plates 61 are spaced from each other a distance sufficient to permit a limited play of the sealing disks 60 as the discharge end of the drum 9 moves up or down. Like sealing devices are used at the forward end of the casing 10 as shown in Fig. 2 wherein it will be seen that the drum 9 is provided with the channel iron band 63 upon which loosely fits the sealing disk 64 and that surrounding this sealing disk is a ring 65 having the oppositely disposed annular plates 66, one on each side of the sealing plate 64.

The operation of our invention will be obvious from what has gone before. The material to be dried is first discharged from the conveyer 35 into the hopper 34. This hopper is provided with a gate 67 which is pivoted at 68 and has a counterweighted arm 69. When sufficient material is deposited within the hopper 34 the gate will drop against the counterweight allowing the material to slide down onto the floor 31 of the conveyer casing 30. The conveyer slats moving along this floor sweep the material forward and gradually drop the material downward upon the grate 20. Here it is submitted to a blast of air driven upward by the fan 25. This partially heats and partially dries the material which then passes downward through the chute 21 into the screen 14 where it is tumbled about as before described and gradually dried. The pieces of material small enough to pass through the perforations of the screen drop into the revolving drum and are gradually lifted and dropped and fed forward, all the time being submitted to the action of the mingled air and products of combustion passing from the furnace and from the air passage 8 as shown by dotted lines in Fig. 1. Eventually the fully dried material passes out at the tail end of the drum and drops into the hopper 11 and is discharged. The material to be dried is raised in temperature by falling through the hot gases from the furnace and combustion chamber to a point where the moisture commences to be driven off. The air admitted through the air passage or flue 8 becomes heated and in passing around and over the lumps of material absorbs the moisture. The temperature of the material is not raised to 212 degrees Fahrenheit until very nearly dried. By passing a large volume of hot air through the particles of falling material, a large amount of moisture is absorbed. The object of the revolving screen 14 is to retain large lumps and pieces and suspend them as it were in the passing gases. The larger chunks become heated and as the screen revolves wear away until they are of sufficient size to pass through the perforations of the screen. As the material passes over the grating 20, the hot air and gases of course commence their heat absorbing action. Such small particles of dust and dry material coming from the cylinder as come in contact with the wet material passing the grating will adhere to the lumps and particles of the moist material and being dry will absorb a certain percentage of moisture and will be returned to the drier and thus to the bin or by way of the discharge chute. The amount of air admitted depends upon the percentage of moisture contained within the material and also the amount of heat necessary to start evaporation.

While we do not, of course, limit ourselves to the use of this machine with any particular material, it is particularly adapted to drying iron ore, pulverized rock, clays, sands and other similar materials. Particular attention is called to the fact that the eddy current caused by the baffles 16 in the chamber 15 and the relatively large capacity of this current causes a relatively slow movement of the ore through the collecting chamber, and this combination of the slow movement of the ore with the eddy currents therein allows the dust to settle and return to the feed chute 21. Such light particles of dust as are not retained in this collecting chamber 15 will pass together with the heated air and gases up through the stack 17.

Figure 3:
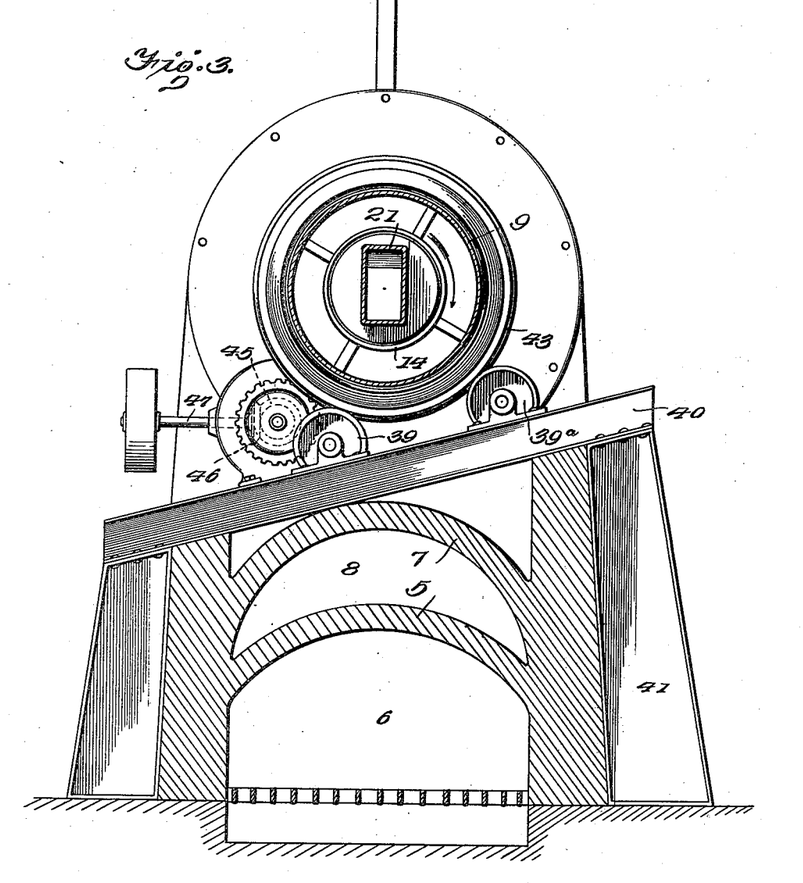
Fig. 3 is a section on the line 3—3 of Fig. 2.

The purpose of arranging the supporting rollers in the manner shown in Fig. 3 is to locate the driving pinion 46 directly under the load. When the power is applied to the driving pinion, the tendency is to lift the drier. Inasmuch as the bearing wheel 39ª is set higher than the bearing wheel 39, it will prevent the drier from being thrown over. The point marked X in Fig. 3 represents the center of the load of material carried in the drier.

What we claim:

1. In a drying apparatus, a rotatable drum, means rotatably supporting the drum at one end, spaced members supporting the other end of the drum, and means for lifting said pair of members coincidentally and coincidentally shifting them in the arc of a circle parallel to the longitudinal axis of the drum to thereby keep the face of the rollers parallel to the face of the drum.

2. In a drying apparatus, a rotatable drum rotatably mounted at one end, rollers supporting the other end of the drum, and means for lifting said rollers and coincidently shifting them in the arc of a circle parallel to the longitudinal axis of the drum to thereby keep the faces of the rollers parallel to the face of the drum.

3. In a drying apparatus, a drum rotatably mounted at one end, a pair of rollers supporting the other end of the drum, each roller having oppositely projecting trunnions, lifting screws disposed beneath each trunnion, means for rotating said lifting screws and including means for rotating the lifting screws for the trunnions on one side of the rollers at a greater speed than the lifting screws on the other side of the trunnions.

4. In a drying apparatus, a drum rotatably mounted at one end, rollers supporting the drum at its other end, each of said rollers having oppositely projecting trunnions, a pair of beams upon which said trunnions are mounted, a pair of lifting screws for each beam disposed at opposite ends thereof, means for rotating one pair of lifting screws, and means for rotating the other pair of lifting screws from the first pair.

5. In a drying apparatus, a drum rotatably mounted at one end, rollers supporting the drum at its other end, each of said rollers having oppositely projecting trunnions, a pair of beams upon which said trunnions are mounted, a pair of lifting screws for each beam disposed at opposite ends thereof, means for rotating one pair of lifting screws, and means for rotating the other pair of lifting screws from the first pair, said means being adapted to rotate the second named pair of lifting screws at a lower rate of speed than the first pair of lifting screws.

6. In a drying apparatus, a rotatable drum, rollers supporting one end of the drum, a pair of transverse beams upon which the rollers are mounted, a pair of lifting screws disposed at each end of each beam, rocking nuts through which the screws pass, a support for said nuts, a worm gear wheel mounted upon the screws to rotate the latter, shafts one for each pair of gear wheels and having worms thereon engaging with the gear wheels, means for rotating one of said shafts, a gear wheel on the said shaft, and a gear wheel on the other shaft for engaging the first named gear wheel.

7. In a drying apparatus, a rotatable drum, rollers supporting one end of the drum, a pair of transverse beams upon which the rollers are mounted, a pair of lifting screws disposed at each end of each beam, rocking nuts through which the screws pass, a support for said nuts, a worm gear wheel mounted upon the screws to rotate the latter, shafts one for each pair of gear wheels and having worms thereon engaging with the gear wheels, means for rotating one of said shafts, a gear wheel on the said shaft, and a gear wheel on the other shaft for engaging the first named gear wheel, said last named gear wheel being larger than the first named gear wheel whereby to drive the shafts at different speeds.

8. In a drying apparatus, a rotatable drying drum open at both ends, a hopper discharging its contents into one end of the drum, said hopper having a perforated side, a furnace having a hot air connection leading into the outlet end of the drum, a suction fan disposed at the inlet end of the drum, said suction fan discharging into said hopper.

9. In a drying apparatus, a drying drum open at both ends, a furnace discharging hot air and products of combustion into the discharge end of the drum, a hopper having a duct leading into the inlet end of the drum, said hopper having a perforated side, a suction fan operatively connected to the inlet end of the drum and drawing the hot air therethrough and discharging the hot air through the perforated side of the hopper, a dust collecting chamber leading from the hopper, and means for discharging material onto said perforated side of the hopper.

10. In a drying apparatus of the character described, a main drying chamber, a hopper having a grated side and having a duct leading into the main drying chamber, means for discharging material into the hopper and against the grated side thereof, and means for drawing heated gas through the main drying chamber, forcing said heated gas through the grated side of the hopper.

11. In a drying apparatus of the character described, a main drying chamber, a hopper having a duct connected to the main drying chamber and being formed with a grated side, a dust collector disposed above the hopper and having baffles for impeding the passage of air therethrough, and means for drawing heated gas through the main drying chamber, forcing said heated gas through the grated side of the hopper.

12. In a drying apparatus of the character described, a main drying chamber, a hopper having a duct leading from the lower end of the hopper into the main drying chamber, a relatively large dust collecting chamber supported above the hopper, means for discharging material into the hopper, means for drawing heated gases through the main drying chamber and forcing them through the hopper into contact with the material therein and thence into the dust collector whereby the dust settling in the dust collecting chamber will pass again into the hopper and in contact with the material therein.

13. In a drying apparatus of the character described, a main drying chamber, a preliminary treating chamber connected thereto, means for heating and drying the material in the main drying chamber, means for heating and drying the material in the preliminary treating chamber, and means for causing the dried dust passing out of the preliminary treating chamber to be returned thereto so as to absorb the moisture in the preliminary treating chamber.

14. In a drying apparatus of the character described, a main drying chamber, a hopper having a grated side wall, the lower end of the hopper being connected by a duct to the main drying chamber, a dust settling chamber disposed above the hopper and having means therein for impeding the upward movement of hot air therethrough, means for discharging material into the hopper and upon the grated surface thereof, means for supplying heated air to the main drying chamber, means for forcing air through the grated side of the hopper into contact with the material thereof and into the dust settling chamber, the settling chamber acting to permit the dust passing thereinto with the hot air to settle back into the hopper, collect upon the material disposed upon the grated face and be carried back into the main drying chamber.

15. In a drying apparatus of the character described, a hopper having an inclined wall, said wall being formed by a grating, a conveyer casing extending across the hopper and beyond the same and having a bottom, that portion of the bottom of the casing located above the hopper being gradually narrowed from one wall of the hopper to the other wall thereof, a conveyer having transverse slats operating over the bottom of the conveyer casing, and means for discharging material into that portion of the conveyer casing which projects beyond the hopper.

16. In a drying apparatus of the character described, a hopper having an inclined perforated wall, said wall being pivoted so that its inclination may be varied, means for discharging material upon said wall, and means for forcing heated gases through the wall.

17. In a drying apparatus of the character described, a hopper having an inclined wall, said wall being formed of a plurality of pivoted slats, said slats forming a grating and the slats being rotatable to vary the angle of the slats relative to the angle of the wall, and means for forcing fluid through said slats into the hopper.

18. In a drying apparatus, a hopper having an inclined wall pivoted at its lower end to permit the wall to be angularly adjusted, said wall being provided with a plurality of pivoted slats whereby the slats may be adjusted to vary their angular relation, and means for forcing heated gases through the slats into said hopper.

19. In a drying apparatus, a rotatable drum, means for rotatably supporting the drum at one end and for vertically adjusting that end of the drum, an inclosing casing, a band mounted upon the hopper and having a laterally concaved face, an annular plate surrounding the band, and spaced annular plates mounted upon the inclosing casing and disposed one on each side of the annular plate whereby to prevent an escape of gas from the space between the drum and the inclosing casing but permit a variation in the inclination of the drum.

20. In a drying apparatus, a rotatable drum, rollers supporting one end of the drum, rollers supporting the other end of the drum, means for vertically adjusting said last named rollers to thereby vary the inclination of the drum, and means for tilting said rollers as they rise coincidentally with their elevation to thereby cause the face of the rollers to extend at all times parallel to the circumference of the drum.

21. The combination with a rotatable drum, of rollers supporting said drum, means for raising the rollers to change the inclination of the drum, and means for automatically shifting the rollers as the drum is raised or lowered to cause the faces of the rollers at all times to be parallel to the circumference of the drum.

In testimony whereof we affix our signatures in presence of two witnesses.

BERNARD R. BEHNKE. [L. S.]
VERNON KEECH.

Witnesses:
CHAS. WALKER,
EILERT P. EILERTSON.